United States Patent [19]

Matsuda et al.

[11] Patent Number: 4,667,477

[45] Date of Patent: May 26, 1987

[54] CRYOPUMP AND METHOD OF OPERATING SAME

[75] Inventors: Toshiharu Matsuda, Kudamatsu; Norihide Saho; Minoru Imamura, both of Yamaguchi; Nobuyuki Hosomi, Hikari, all of Japan

[73] Assignee: Hitachi, Ltd., Tokyo, Japan

[21] Appl. No.: 716,941

[22] Filed: Mar. 28, 1985

[51] Int. Cl.[4] .............................................. B01D 8/00
[52] U.S. Cl. ...................................... 62/55.5; 55/269; 62/227; 62/228.4; 62/268; 417/901
[58] Field of Search ................ 62/55.5, 100, 268, 227, 62/228.4, 514 R; 55/269; 417/901

[56] References Cited

U.S. PATENT DOCUMENTS

| | | | |
|---|---|---|---|
| 3,252,652 | 5/1966 | Trendelenburg et al. | 62/55.5 |
| 3,407,615 | 10/1968 | Klipping | 62/514 R |
| 3,585,807 | 6/1971 | Hengevoss et al. | 62/55.5 |
| 3,667,246 | 6/1972 | St. Lorant et al. | 62/514 R |
| 3,803,863 | 4/1974 | Jednagz et al. | 62/227 |
| 3,803,865 | 4/1974 | Newton | 62/227 |
| 4,285,710 | 8/1981 | Welch | 62/268 |
| 4,397,155 | 8/1983 | Davey | 62/6 |
| 4,417,448 | 11/1983 | Horn et al. | 62/6 |
| 4,454,722 | 6/1984 | Bartlett et al. | 62/55.5 |

Primary Examiner—Ronald C. Capossela
Attorney, Agent, or Firm—Antonelli, Terry & Wands

[57] ABSTRACT

A cryopump and a method of operating the same, with the cryopump being provided with a cryopanel adapted to be cooled with cold heat generated by a cold heat generating device, and remove the ambient gas, and a device for regulating the temperature of said cryopanel in accordance with the ambient conditions. The cryopump is capable of varying its pumping speed by regulating in accordance with the ambient conditions the temperature of the cryopanel which is adapted to be cooled with cold heat and remove the ambient gas.

15 Claims, 12 Drawing Figures

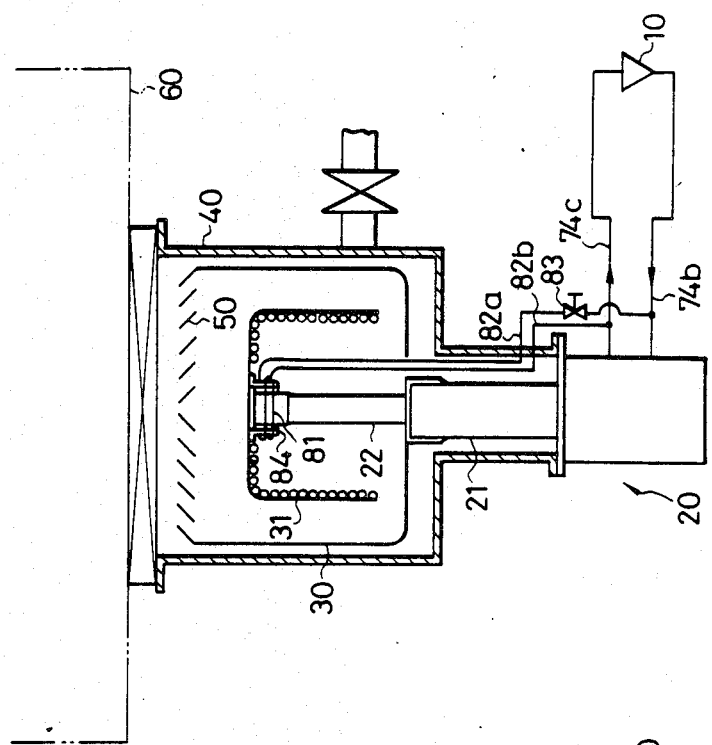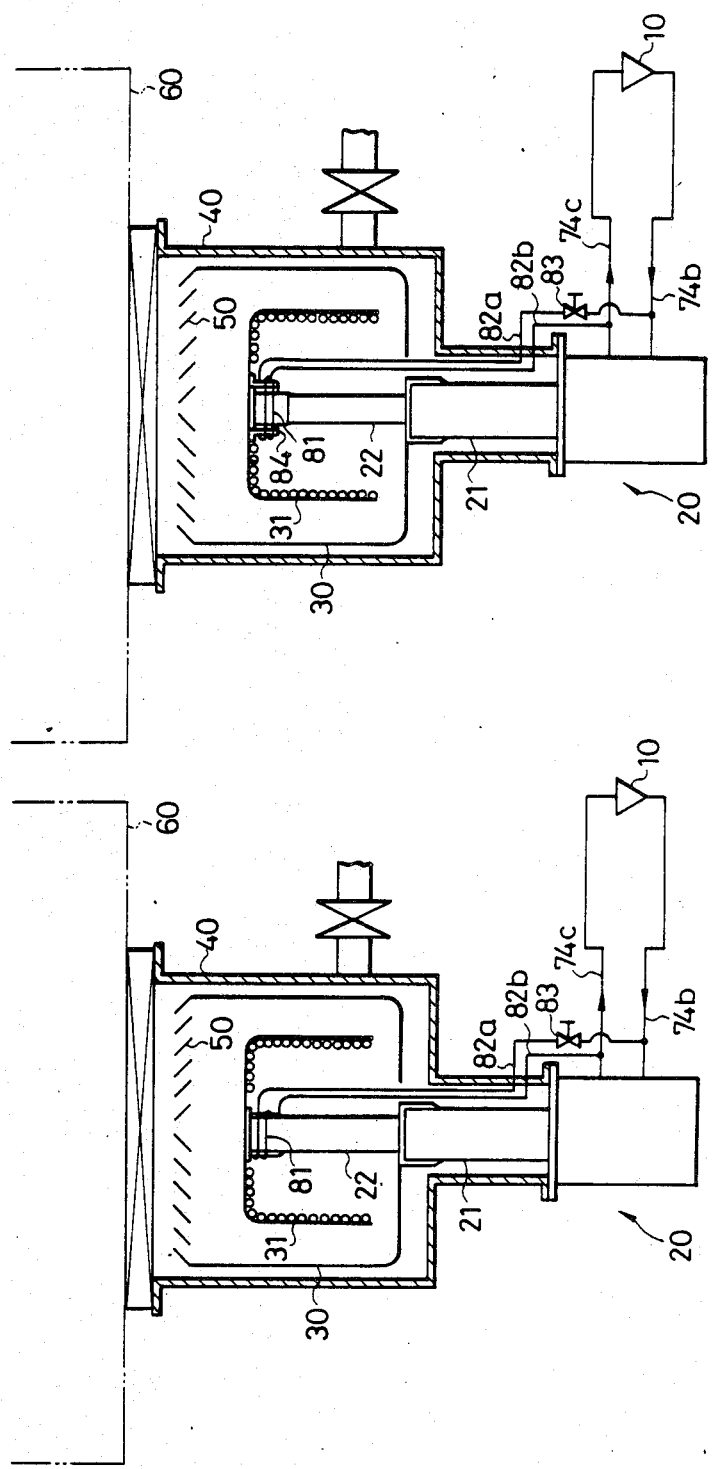

CRYOPUMP AND METHOD OF OPERATING SAME

BACKGROUND OF THE INVENTION

This invention relates to a cryopump and a method of operating the same, and more particularly, to a method and cryopump carring out a pumping operation while varying a pumping speed.

In, for example, U.S. Pat. No. 4,285,710, a cryopump of the aforementioned type is proposed wherein a two-stage expander comprises a first-stage expansion chamber and a second-stage expansion chamber. An aluminum support structure is attached to a distal end wall of the first-stage expansion chamber. A cylindrical pumping structure, constituting a first-stage pumping structure, is attached to the aluminum support structure so that the former is in an intimate thermal contact with the latter. A plate is attached to an end wall of the second-stage expansion chamber, and a frustoconical member, constituting a second-stage pumping structure, is attached to the plate so that the frustoconical member skirts a portion of the second-stage expansion chamber. A variable aperture flow restricting device is attached directly to a first (i.e. warmer) stage of a two-stage cryogenic pumping structure. Such a pumping apparatus is placed in a housing structure.

In this cryopump, the first-stage expansion of a helium gas occurs in the first-stage expansion chamber, so that the first-stage temperature is selected typically in the range of 50°–80° K. The second-stage expansion of the helium gas occurs in the second-stage expansion chamber, so that the second-stage temperature is selected typically in the range of 10°–20° K. The temperatures attainable in the first and second refrigeration stages are determined by the parameters of a refrigeration system. On the other hand, the temperature of the variable aperture flow restricting device, which requires a constant pumping speed, is maintained at such a cryogeneric temperature that is lower than the condensation temperature of gases (e.g. water vapor, carbon dioxide) and not lower than the condensation temperature of a selected gas (e.g. argon). The controlled variation at a pumping speed of this selected gas may be provided by throttling the apertured portion of the variable aperture flow restricting device.

The above proposed cryopump is used suitably in a sputtering system, and is capable of removing a gas, such as argon from a sputtering chamber as a constant water vapor pumping speed is maintained, at a different speed.

However, disadvantages of the above described cryopump resides in the fact that a cross-sectional area of a space through which a gas passes and the conductance decrease due to the variable aperture flow restricting device. Accordingly, a maximum pumping speed of the proposed cryopump decreases as compared with a cryopump which uses an expansion means having the same cold heat generating capacity, and no pumping speed varying functions. For example, if the variable aperture flow restricting device mentioned above is provided in a cryopump having no pumping speed varying functions, for example, a cryopump having a maximum pumping speed of 3000 l/s, the maximum pumping speed decreases to substantially 1500 l/s even when the throttling is done so as to obtain a maximum degree of opening of the variable aperture of this device. Namely, providing the variable aperture flow restricting device in a cryopump to furnish the pump with the pumping speed varying functions means reduces the maximum pumping speed thereof.

An object of the present invention is to provide a cryopump capable of varying a pumping speed by regulating, in accordance with ambient conditions, a temperature of a cold panel, and a method of operating the same.

The present invention enables a pumping speed of a cryopump, provided with a cryopanel cooled with the cold heat from a cold heat generating means to remove an ambient gas, and a means for regulating, in accordance with ambient temperature, the temperature of the cryopanel, to be varied by operating the cryopump while regulating the temperature of the cryopanel.

BRIEF DESCRIPTION OF THE DRAWINGS

FIG. 11 is a schematic view of a ninth embodiment of the cryopump according to the present invention; and FIG. 12 is a schematic view of a tenth embodiment of the cryopump according to the present invention.

DETAILED DESCRIPTION

An embodiment of the present invention will now be described with reference to FIG. 1.

Figure 1:
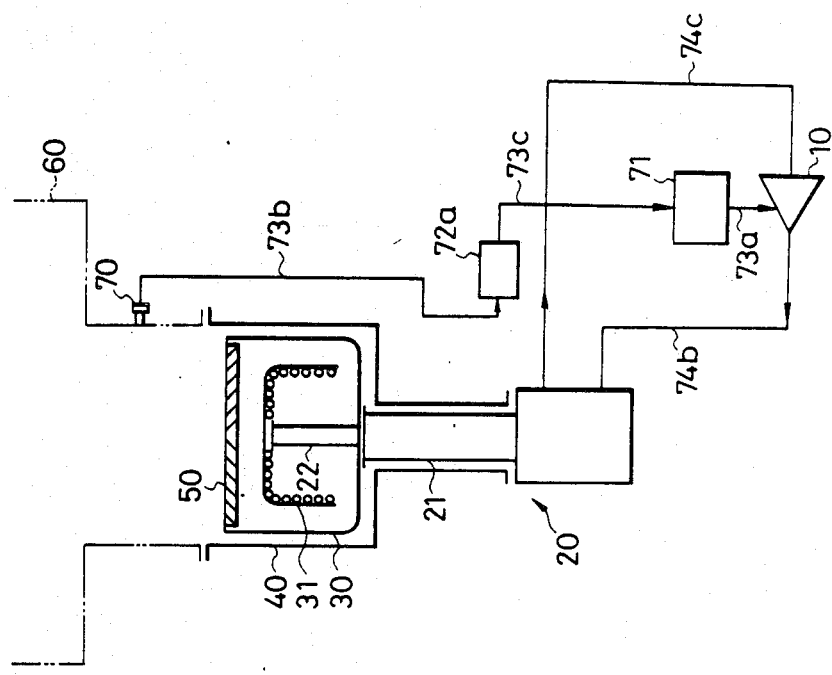
FIG. 1 is a schematic view of an embodiment of a cryopump according to the present invention.

Referring now to the drawings wherein like reference numerals are used throughout the various views to designate like parts and, more particularly, to FIG. 1, a cryopump is provided with first- and second-stage cryopanels 30, 31 which are attached to a first and second cold stations in first- and second-stage expansion means or refrigerating members 21, 22 in, for example, a two-stage regenerating refrigerator generally designated by the reference numeral 20 in a cold heat generating means. The cold heat generating means includes, for example, a compressor 10 adapted for a working gas of room temperature and a low pressure, to compress the same and discharge a working gas of room temperature and a high pressure therefrom, and an expansion means adapted to adiabatically expand the working gas of room temperature and a high pressure discharged from the compressor 10, to generate cold heat and, for example, the refrigerator 20. The refrigerator 20 is cooled with the cold heat generated by the first- and second-stage refrigerating members 21, 22, to condense or solidify the ambient gas and thereby remove the same. Means are provided for regulating the temperature of a cryopanel, in this case, the second-stage cryopanel 31. The first- and second-stage refrigerating members 21, 22 in the refrigerator 20 and the first- and second-stage cryopanels 30, 31 are housed in a vessel 40. The portion of the vessel 40, opposed to the second-stage cryopanel 31, is opened. A baffle 50 is joined to the first-stage cryopanel 30 so that the baffle 50 is positioned between the second-stage cryopanel 31 and the opening of the vessel 40. When the vessel 40 is joined to a part into which the gas is pumped, for example, a vacuum chamber 60 so that the former is communicated with the latter via the opening of the former, the cryopump is rendered capable of evacuating the vacuum chamber 60. The means for regulating the temperature of the second-stage cryopanel 31 includes a pressure sensor 70 working as a means for detecting the ambient pressure, and a means for controlling a flow rate of the working gas which is supplied to the refrigerator 20, in accordance with a signal which the control means receives from the pressure sensor 70. This control means includes a means for converting the revolution number of a driving motor for the compressor 10, for example, an inverter 71, and a control unit 72a adapted to receive a signal from the pressure sensor 70 and control an output frequency from the inverter 71 in accordance with a difference between a preset pressure and a pressure detected by the pressure sensor 70. The pressure sensor 70 in FIG. 1 is provided so that it can detect the pressure in the vacuum chamber 60. The inverter 71 is provided outside the vessel 40 and is vacuum chamber 60 and connected to the driving motor for the compressor 10 through a lead wire 73a. The control unit 72a is provided outside vessel 40 and vacuum chamber 60, and the pressure sensor 70 and inverter 71 are connected to this control unit 72a through lead wires 73b, 73c, respectively. The baffle 50 in use is identical with the baffle used in a conventional cryopump having no pumping speed varying functions. Since the regulation of the pumping speed at the baffle 50 in FIG. 1 is not required, it is formed to such a shape that enables a maximum cross-sectional area of the part (aperture portion) through which a gas passed to be obtained, i.e., the pumping speed of the gas which can be removed by the second-stage cryopanel 31 to become the highest.

Referring to FIG. 1, the operations of the compressor 10 and refrigerator 20 are started at room temperature. At this time, the roughing operation in the vacuum chamber 60 shall have been completed. Simultaneously with the starting of the operations of the compressor 10 and refrigerator 20, the temperature in the second cold station in the second-stage refrigerator 22 begins to go down, and this temperature reaches a substantially constant level in 1-2 hours, though the length of this time varies with the size of the cryopump. In accordance with such a temperature drop at the second cold station in the second-stage refrigerator 22, the temperature of the second-stage cryopanel 31 goes down, so that the pressure in the vacuum chamber 60 drops. The variations in the pressure in the vacuum chamber 60 is detected by the pressure sensor 70, and a signal representative of the results of this detection is inputted into the control unit 72a. When the pressure, which has been detected by the pressure sensor 70, in the vacuum chamber 60 becomes lower during this time than the pressure set in advance in the control unit 72a, the output frequency of the inverter 71 is reduced by the control unit 72a. Consequently, the revolution number of the compressor 10 decreases, and the flow rate of the working gas of room temperature and a high pressure discharged from the compressor 10 and supplied to the refrigerator 20 decreases. Due to such a decrease in the flow rate of the working gas, the amount of generation of cold heat in the second-stage refrigerator 22 decreases, and the temperature of the second cold station in the same refrigerator 22 rises in accordance with the degree of decrease in this generation rate. In accordance with the rise in the temperature of the second cold station in the second-stage refrigerator 22, the temperature of the second-stage cryopanel 31 rises, so that the pressure in the vacuum chamber 60 rises. On the other hand, when the pressure, which has been detected by the pressure sensor 70, in the vacuum chamber 60 becomes higher than the pressure (which may be equal to or different from the above-mentioned set pressure) set in advance in the control unit 72a, the output frequency of the inverter 71 is increased by the control unit 72a. As a result, the revolution number of the compressor 10 increases, and the flow rate of the working gas of room temperature and a high pressure discharged from the compressor 10 and supplied to the refrigerator 20 increases. Due to such an increase in the flow rate of the working gas, the amount of generation of cold heat in the second-stage refrigerator 22 increases, so that the temperature of the second cold station in the same refrigerator 22 goes down in accordance with the degree of increase in the mentioned generation rate. In accordance with such a temperature drop at the second cold station in the second-stage refrigerator 22, the temperature of the second-stage cryopanel goes down, so that the pressure in the vacuum chamber 60 drops. With the embodiment of FIG. 1, the pumping speed of the cryopump can be varied without sacrificing the maximum pumping speed of the gas which can be removed by the second-stage cryopanel 31, by regulating the temperature of this cryopanel. Moreover, since the discharge rate of the working gas from the compressor can be controlled in accordance with the pressure in the vacuum chamber 60, the wasteful use of the power for operating the compressor can be prevented, so that the cost of operating the cryopump can be saved. Additionally, a conventional cryopump without its own pumping speed varying functions can be modified to a pumping speed-variable cryopump by merely providing a pressure sensor 70, an inverter 71 and a control unit 72a in the former cryopump in the above-mentioned manner.

When the cryopump of FIG. 1 is applied to an apparatus, in which it is necessary to vacuum the interior of a vacuum chamber 60 from the atmospheric pressure to a predetermined pressure, and then carry out an operation while retaining the pressure in a predetermined level in, for example, an argon gas atmosphere, the consumption of the argon gas can be minimized. In order to maintain the pressure in the vacuum chamber 60 in a predetermined level, it is necessary that the argon gas be supplied from the outside into the vacuum chamber 60 at such a flow rate that correspond to that of the argon gas removed therefrom. In this embodiment, the pumping speed in the cryopump is set in a low level to reduce the flow rate of the argon gas removed from the vacuum chamber 60. Accordingly, the flow rate of the argon gas supplied from the outside into the vacuum chamber 60 can be correspondingly reduced so that the consumption of argon gas can be minimized.

Figure 2:
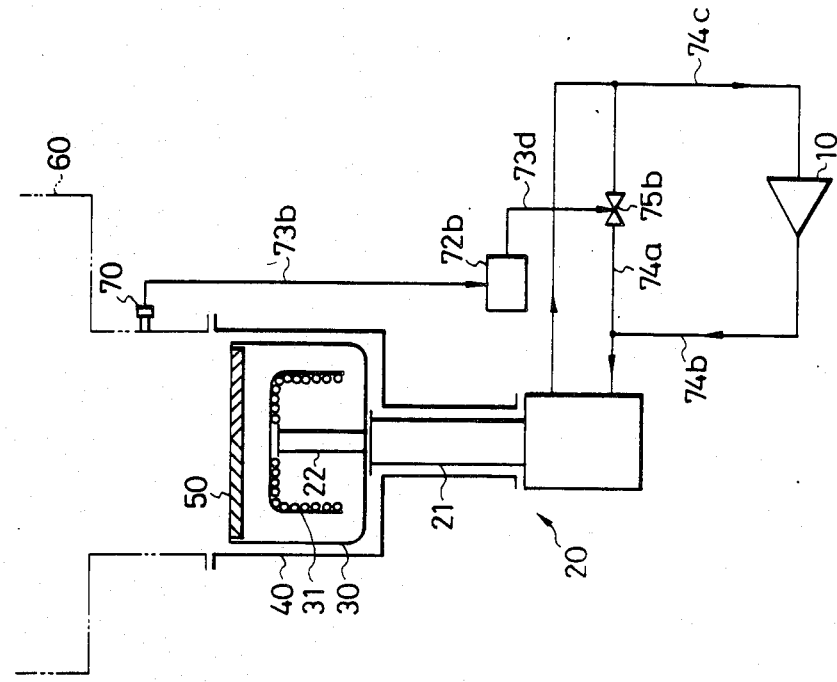
FIG. 2 is a schematic view of a second embodiment of the cryopump according to the present invention.

Referring to FIG. 2, a means for controlling a flow rate of a working gas, which is supplied to a refrigerator 20, upon receipt of a signal from a pressure sensor 70 includes a bypass pipe 74a, a variable flow rate valve 75a and a control unit 72b adapted to receive a signal from the pressure sensor 70 and control the degree of opening of the variable flow rate valve 75a in accordance with a difference between a preset pressure and the pressure detected by the pressure sensor 70.

As shown in FIG. 2, a discharge port for the working gas of the compressor 10 and a feed port of the refrigerator 20 are connected together by a high-pressure pipe 74b. A discharge port for the working gas of the refrigerator 20 and a suction port of the compressor 10 are connected together by a low-pressure pipe 74c. A bypass pipe 74a is connected to its one end to the high-pressure pipe 74b, and at the other end thereof to the low-pressure pipe 74c. The flow rate-variable valve 75a is provided in the bypass pipe 74a. The control unit 72b is provided outside the vessel 40 and vacuum chamber 60, and the pressure sensor 70 and the flow rate-variable valve 75a are connected to the control unit 72b through lead wires 73b, 73d, respectively.

For example, when the pressure in the vacuum chamber 60 in the embodiment of FIG. 2, which has been detected by the pressure sensor 70, becomes lower than the pressure set in advance in the control unit 72b, the degree of opening of the flow rate-variable valve 75a is increased by the same control unit 72b. Consequently, a part of the working gas of room temperature and a high pressure, which is discharged from the compressor 10 and flows through the high-pressure pipe 74b, is introduced into the bypass pipe 74a. This causes the flow rate of the working gas of room temperature and a high pressure supplied to the refrigerator 20 to decrease. As a result, a phenomenon similar to the phenomenon described above in connection with the embodiment of FIG. 1 occurs, so that the pressure in a vacuum chamber 60 increases. When the pressure, which has been detected by the pressure sensor 70, in the vacuum chamber 60 becomes higher than a pressure (which may be equal to or different from the above-mentioned set pressure) set in advance in the control unit 72b, the degree of opening of the flow rate-variable valve 75a is lowered by the control unit 72b. Consequently, the flow rate of the part of the working gas of room temperature and high pressure discharged from the compressor 10 and flows through the high-pressure pipe 74b which is introduced into the bypass pipe 74a decreases to a low level or zero, so that the flow rate of the working gas of room temperature and high pressure supplied to the refrigerator 20 increases. As a result, a phenomenon similar to the phenomenon referred to in the description of the embodiment of FIG. 1 occurs to cause the pressure in the vacuum chamber 60 to drop.

With the embodiment of FIG. 2, the pumping speed of the cryopump can be varied without sacrificing the maximum pumping speed of the gas which can be removed by the second-stage cryopanel 31, by regulating the temperature of the same cryopanel.

Moreover, a conventional cryopump without its own pumping speed varying functions can be modified to a pumping speed-variable cryopump by merely providing a pressure sensor 70, a bypass pipe 74a, a flow rate-variable valve 75a and a control unit 72b in the former cryopump in the above-mentioned manner.

Additionally, since the inverter 71 in the embodiment of FIG. 1 can be omitted, the modifying of a cryopump having no pumping speed varying functions to a pumping speed-variable cryopump can be done at a low cost.

Figure 3:
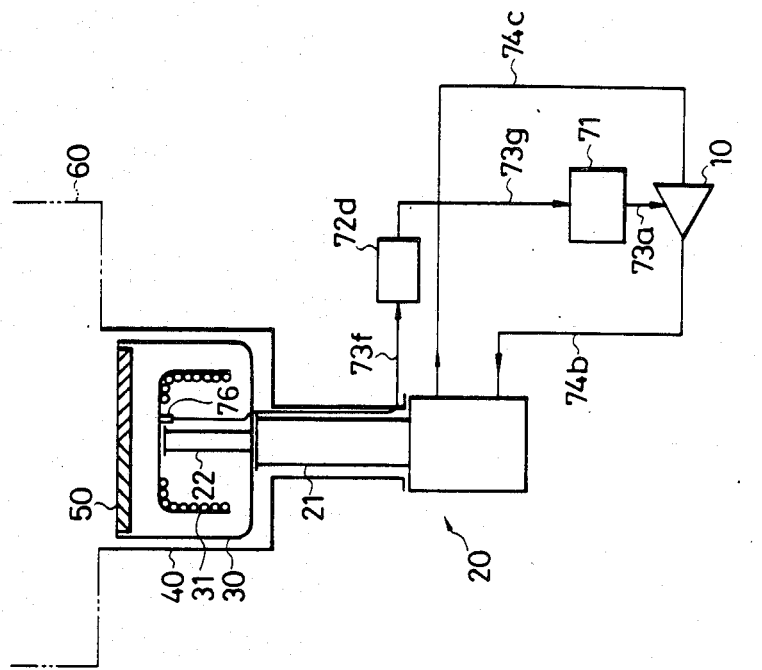
FIG. 3 is a schematic view of a third embodiment of the cryopump according to the present invention.

Referring to FIG. 3, a means for controlling a flow rate of a working gas, which is supplied to a refrigerator 20, in accordance with a signal from a pressure sensor 70 is constituted by a valve 75b, and a control unit 72c adapted to receive a signal from the pressure sensor 70 and control the degree of opening of the valve 75b in accordance with a difference between the pressure set in advance and the pressure detected by the pressure sensor 70.

Referring to FIG. 3, the valve 75b is provided in a high-pressure pipe 74b. The control unit 72c is provided outside a vessel 40 and a vacuum chamber 60, and the pressure sensor 70 and valve 75b are connected to the control unit 72c through lead wires 73b, 73e, respectively.

For example, the pressure, which is detected by the pressure sensor 70, in the vacuum chamber 60 in the embodiment of FIG. 3 becomes lower than the pressure set in advance in the control unit 72c, the degree of opening of the valve 75b is reduced by the control unit 72c. Accordingly, the flow rate of the working gas of room temperature and high pressure supplied to the refrigerator 20 decreases. Consequently, a phenomenon similar to the phenomenon referred to in the description of the embodiment of FIG. 1 occurs, so that the pressure in the vacuum chamber 60 rises. When the pressure, which is detected by the pressue sensor 70, in the vacuum chamber 60 becomes higher than the pressure (which may be equal to or different from the above-mentioned set pressure) set in advance in the control unit 72c, the degree of opening of the valve 75b increased by the control unit 72c. This causes the flow rate of the working gas of room temperature and high pressure supplied to the refrigerator 20 to increase. As a result, a phenomenon similar to the phenomenon referred to in the description of the embodiment of FIG. 1 occurs, so that the pressure in the vacuum chamber 60 drops.

With the embodiment of FIG. 3, the pumping speed of the cryopump can be varied without sacrificing the maximum pumping speed of the gas wich can be removed by the second-stage cryopanel 31, by regulating the temerature of the same cryopanel.

Additionally, a conventional cryopump without its own pumping speed varying functions can be modified to a pumping speed-variable cryopump by merely providing a pressure sensor 70, a valve 75 and a control unit 72a in the former cryopump in the above-mentioned manner.

Moreover, since the bypass pipe 74a used in the embodiment of FIG. 2 can be omitted, the modifying of a cryopump having no pumping speed-varying functions to a pumping speed-variable cryopump can be done at a further low cost.

Figure 4:
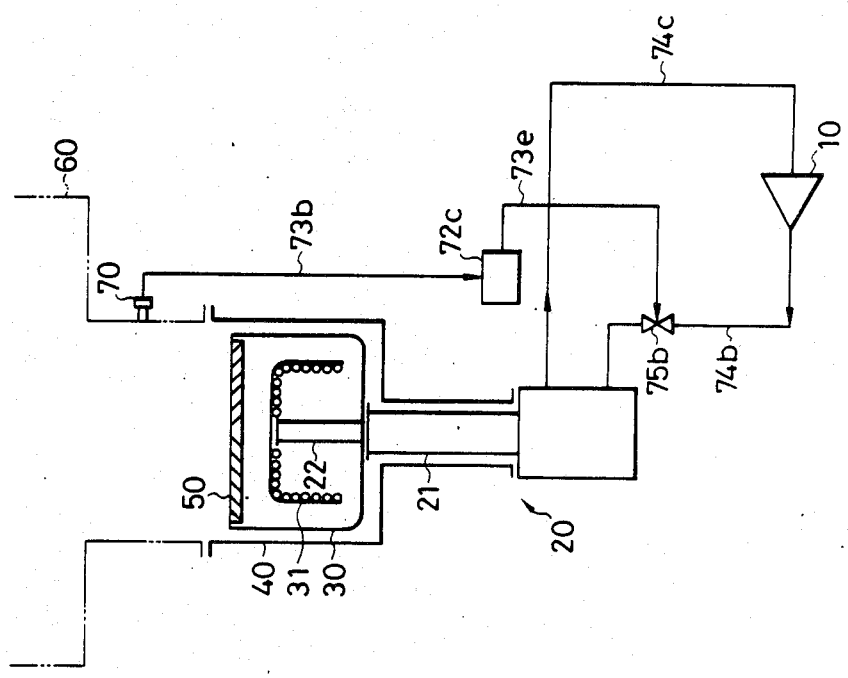
FIG. 4 is a schematic view of a fourth embodiment of the cryopump according to the present invention.

The embodiment of FIG. 4 differs from the embodiment of FIG. 1 in that a means for regulating the temperature of a second-stage cryopanel 31 a temperature sensor 76 constituting a means for detecting the temperature of the second-stage cryopanel 31, and a means adapted to receive a signal from the temperature sensor 76 and control the flow rate of a working gas supplied to a refrigerator 20, with the means for controlling the flow rate of the working gas including a means for converting the revolution number of a driving motor for a compressor 10, for example, an inverter 71, and a control unit 72d adapted to receive a signal from the temperature sensor 76 and control the output frequency of the inverter 71.

Referring to FIG. 4, the temperature sensor 76 is provided on the second-stage cryopanel 31, and the temperature sensor 76 and inverter 71 are connected to the control unit 72d through lead wires 73f, 73g, respectively.

Referring to FIG. 4, in order to vary the pumping speed which corresponds to the temperature of the second-stage cryopanel 31 detected by the temperature sensor 76, the output frequency of the inverter 71 may be varied by the control unit 72d. Due to the variation in the output frequency of the inverter 71, the flow rate of the working gas of room temperature and high pressure discharged from the compressor 10 and supplied to the refrigerator 20 increases or decreases, so that the amount of generation of cold heat in the second-stage refrigerator 22 increases or decreases. Such an increase or decrease in the amount of generation of cold heat causes the temperature of the second-stage cryopanel 31 to drop or rise, and the pumping speed varies in accordance with this result.

In the embodiment of FIG. 4, the same effect as in the the embodiment of FIG. 1 can be obtained.

Figure 5:
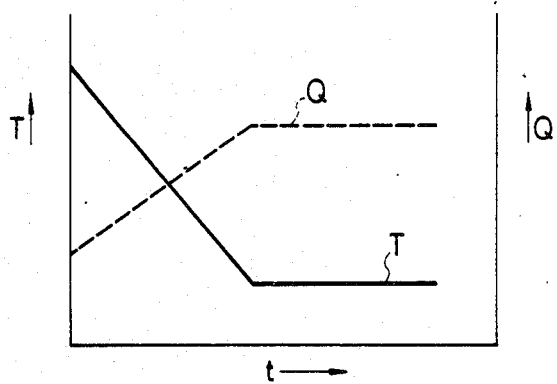
FIG. 5 is a graphical illustration of a relationship between a flow rate Q required by an expansion machine of a working gas and a temperature T of a second cold station and the time t elapsing after the starting of an operation of the cryopump.

In the embodiment of FIG. 4 as well, the temperature of the second cold station in the second-stage refrigerator 22 reaches a substantially constant level in 1-2 hours due to the starting of the operations of the compressor 10 and refrigerator 20 as referred to in the description of the embodiment of FIG. 1. The flow rate Q of the working gas required by the refrigerator 20 increases as shown by a broken line in FIG. 5, immediately after the starting of the operation thereof and in accordance with a drop in the temperature T of the second cold station in the second-stage refrigerator 22, the flow rate Q becoming constant at the same time that the temperature T becomes constant. About 2-3 times of increase in the flow rate of the working gas is required by the refrigerator 20 during the period of time between an instant which is immediately after the starting of the operation and an instant at which the constant operational condition is obtained. This indicates that, if a base flow rate of the working gas of 100% is set as the flow rate thereof required by the refrigerator 20 in a constant operational condition, the flow rate of the working gas at the time which is immediately after the starting of the operation may be about 30-50%. Since this rate of increase is determined by the size of the refrigerator, the relation between the temperature level of the second-stage refrigerator 22 and a required flow rate of a working gas therefor in the same type of cryopumps can be determined by making an experiment on a selected cryopump in advance. Accordingly, when the determined relation between the temperature level of the second-stage refrigerator 22 and a required flow rate of the working gas therefor is inputted into the control unit 72d to control the output frequency of the inverter 71 on the basis of this relation and the temperature, which is detected by the temperature sensor 76, of the second-stage cryopanel 31, the wasteful use of the power for operating the compressor during the period of time between the instant at which the operation is started and the instant at which the constant operational condition is obtained can be prevented, and the cyopump-operating cost can be minimized.

Figure 6:
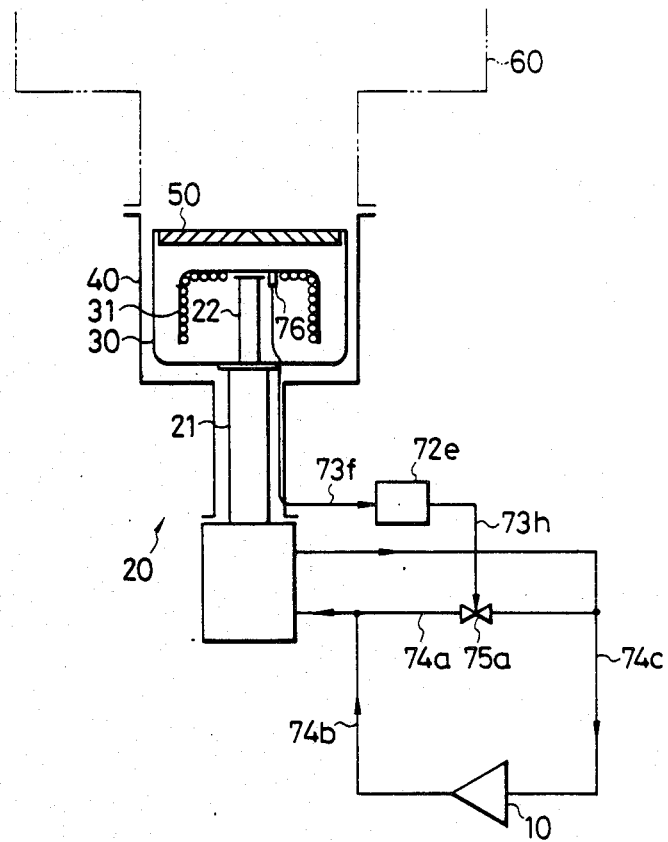
FIG. 6 is a schematic view of a fifth embodiment of the cryopump according to the present invention.

The embodiment of FIG. 6 differs from the embodiment of FIG. 4 in that a means for controlling the flow rate of a working gas consists of a bypass pipe 74a, a flow rate-variable valve 75a and a control unit 72e adapted to receive a signal from a temperature sensor 76 nad control the degree of opening of the flow rate-variable valve 75a.

In the embodiment of FIG. 6, the bypass pipe 74a is connected at its one end to a high-pressure pipe 74b, and at the other end thereof to a low-pressure pipe 74c. The flow rate-variable valve 75a is provided in the bypass pipe 74a. The control unit 72e is provided outside a vessel 40 and a vacuum chamber 60, and the temperature sensor 76 and flow rate-variable valve 75a is connected to the control unit 72e through lead wires 73f, 73h, respectively.

Referring to FIG. 6, in order to vary the pumping speed coresponding to the temperature detected by the temperature sensor 76 of a second-stage cryopanel 31, the degree of opening of the flow rate-variable valve 75a may be caried by the control unit 72e. Due to the variation of the degree of opening of the flow rate-variable valve 75a, the flow rate of the working gas of room temperature and high pressure supplied to a refrigerator 20 increases or decreases, so that the amount of generation of cold heat in a second-stage refrigerator 22 increases or decreases. In accordance with such an increase or a decrease in the amount of generation of cold heat, the temperature of the second-stage cryopanel 31 drops or rises, so that the pumping speed varies correspondingly.

In the embodiment of FIG. 6, the same effects as in the embodiment of FIG. 2 can be obtained.

Figure 7:
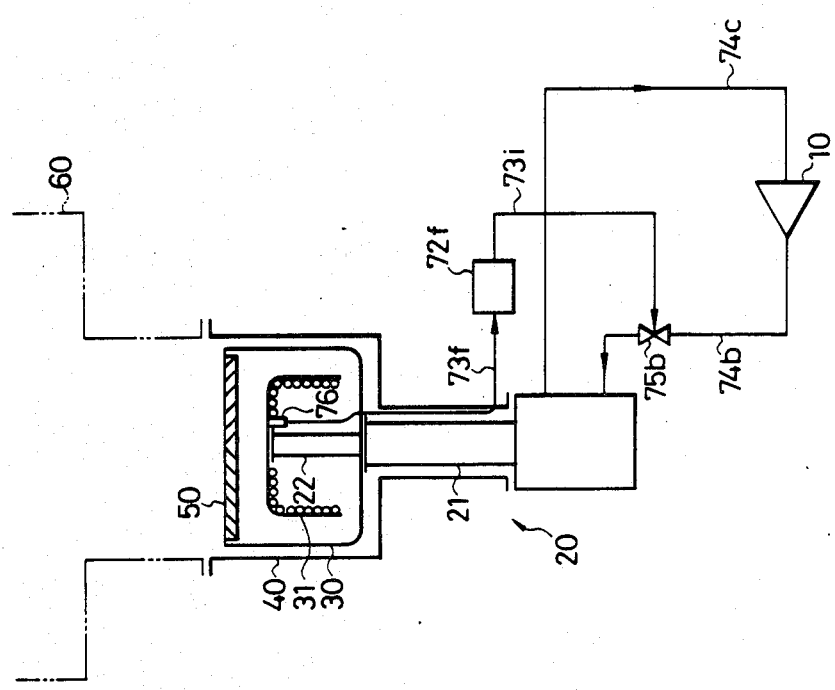
FIG. 7 is a schematic view of a sixth embodiment of the cryopump according to the present invention.

The embodiment of FIG. 7 differs from the embodiment of FIG. 4 in that a means for controlling the flow rate of a working gas including a valve 75b, and a control unit 72f adapted to receive a signal from a temperature sensor 76 and control the degree of opening of the valve 75b.

In the embodiment of FIG. 7, the valve 75b is provided in a high-pressure pipe 74b. The control unit 72f is provided outside a vessel 40 and a vacuum chamber 60, and the temperature sensor 76 and valve 75b are connected to the control unit 72f through lead wires 73f, 73i, respectively.

Referring to FIG. 7, in order to vary the pumping speed corresponding to the temperature of a second-stage cryopanel 31, which is detected by the temperature sensor 76, the degree of opening of the valve 75b may be varied by the control unit 72f. Due to the variation in the degree of opening of the valve 75b, the flow rate of a working gas of room temperature and high pressure supplied to the refrigerator 20 increases or decreases, so that the amount of generation of cold heat in the second-stage refrigerator 22 increases or decreases. Due to such an increase or a decrease in the amount of generation of cold heat, the temperature of the second-stage cryopanel 31 drops or rises, and the pumping speed varies in accordance with this result.

In the embodiment of FIG. 7, the same effects as in the embodiment of FIG. 3 can be obtained.

Figure 8:
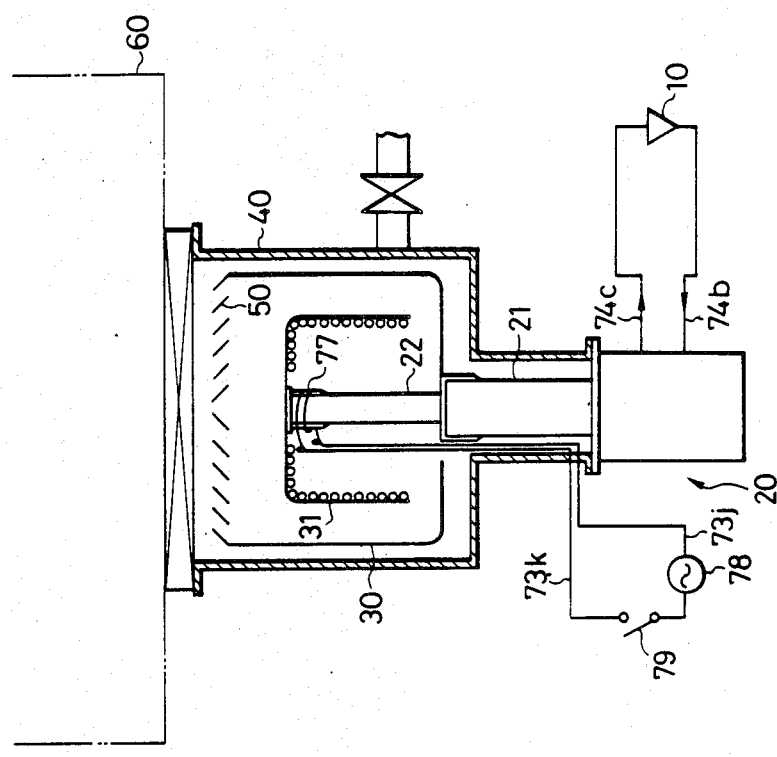
FIG. 8 is a schematic view of a seventh embodiment of the cryopump according to the present invention.

The embodiment of FIG. 8 differs from the embodiment of FIG. 1 in that a means for regulating the temperature of a second-stage cryopanel 31 includes an electric heater 77, a power source 78 and a switch 79.

Referring to FIG. 8, the electric heater 77 is wound around a second cold station in a second-stage refrigerator 22. The power source 78 is provided outside a vessel 40 and a vacuum chamber 60, and the electric heater 77 is connected to the power source 78 through a lead wire 73j and a lead wire 73k on which the switch 79 is provided.

In order to, for example, reduce the actual pumping speed of the embodiment of FIG. 8, the power source 78 and switch 79 may be turned on to apply an electric current to the electric heater 77. When the electric heater 77 is thus turned on, the heat is generated therein, so that the temperature of the second-stage cryopanel 31 rises through a second cold station in the second-stage refrigerator 22. Due to such a temperature rise, the pumping speed decreases to a low level owing to the second-stage cryopanel 31. In order to increase the pumping speed, which is thus reduced to a low level, to a high level, the supply of an electric current from the power source 78 to the electric heater 77 may be cut off, or the flow rate of this electric current may be reduced. With the embodiment of FIG. 8, the pumping speed of the cryopump can be varied without sacrificing the maximum pumping speed of the gas which can be collected by the second-type cryopanel 31, by regulating the temperature of the same cryopanel.

Furthermore, a conventional cryopump without its own pumping speed varying functions can be modified to a pumping speed-variable cryopump by merely providing an electric heater 77, a power source 78 and a switch 79 in the former cryopump in the above-mentioned manner. Additionally, the electric heater 77 is used during an operation for regenerating the second-stage cryopanel 31, the warm up time to room temperature in the cryopanel 31 can be reduced, so that the time required to carry out the cryopanel regenerating operation can be reduced.

If a device capable of automatically controlling the voltage of the power source 78 in accordance with the temperature of the second-stage cryopanel 31, the pumping speed can be varied arbitrarily by merely setting the temperature of this cryopanel 31 by the mentioned device.

Figure 9:
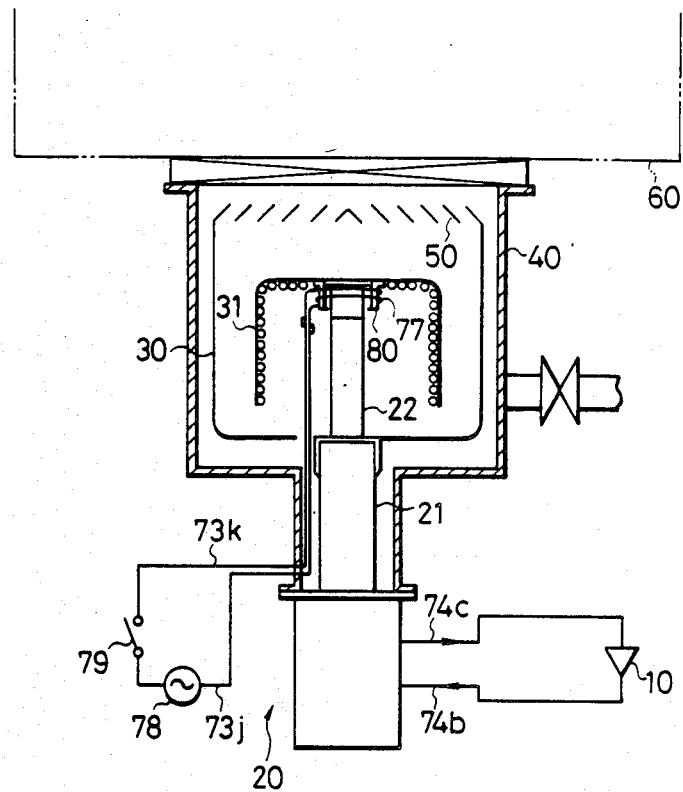
FIG. 9 is a schematic view of an eighth embodiment of the cryopump according to the present invention.
Figure 10:
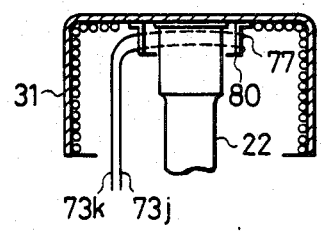
FIG. 10 is longitudinal section, on an enlarged scale of a portion of the cryopump of FIG. 9.

The embodiment of FIGS. 9 and 10 differs from the embodiment of FIG. 8 in that a heater mounting member 80 is provided on the portion of a second-stage cryopanel 31 which is around a second cold station in a second-stage refrigerator 22 with an electric heater 77 wound around the heater mounting member 80.

In the embodiment of FIGS. 9 and 10, the same effects as in the embodiment of FIG. 8 can be obtained as well as the following additional effects. With the embodiment of FIGS. 9 and 10, the temperature of the cryopanel attached to the refrigerator can be increased effectively without accompanying a great increase in the temperature of the second cold station in the second-stage refrigerator 22. This enables the cryopanel regenerating time to be further reduced.

Moreover, when it becomes necessary, during a cryopump repairing operation, to take the first-stage refrigerator, first-stage cryopanel, second-stage refrigerator and second-stage cryopanel out of the vessel, the lead wire of the electric heater 77 may not be cut off each time. Accordingly, the time required for the repair work can be reduced.

The embodiment of FIG. 11 differs from the embodiment of FIG. 8 in that a means for regulating the temperature of a second-stage cryopanel 31 includes a heating pipe 81, and a heating fluid supply source.

In the embodiment of FIG. 11, the heating pipe 81, is for example, wound spirally around a second cold station in the heating pipe 81. The heating fluid supply source includes, for example, a compressor 10, a heating fluid supply pipe 82a, a heating fluid return pipe 82b and a valve 83. One end of the heating fluid supply pipe 82a is connected to an inlet for a heating fluid of the heating pipe 81, and one end of the heating fluid return pipe 82b to an outlet for a heating fluid of the heating pipe 81. The other end of the heating fluid supply pipe 82a joins a high-pressure pipe 74b, and the other end of the heating fluid return pipe 82b a low-pressure pipe 74c. The valve 83 is provided in the portion of the heating fluid supply pipe 82a which is outside a vessel 40 and a vacuum chamber 60.

Referring to FIG. 11, in order to, for example, reduce the actual pumping speed, the valve 83 may be opened to supply a working gas of room temperature and high pressure to the heating pipe 81. Due to the working gas of room temperature, the temperature of a second-stage cryopanel 31 increases via a second cold station. Due to such a temperature rise, the pumping speed at the second-stage cryopanel 31 becomes low. In order to increase the pumping speed which has thus been reduced, the supplying of the working gas of room temperature and high pressure to the heating pipe 81 may be stopped, or the flow rate thereof may be reduced. The pressure of the working gas of room temperature and high pressure is reduced while it passes through the heating pipe 81. After this working gas has then passed through the heating fluid return pipe 82b, it joins a working gas of low pressure passing through the low-pressure pipe 74c to be then returned to the compressor 10. If a device, which is not shown in FIG. 11, for automatically opening and closing the valve 83 in accordance with the temperatures of the second cold station and second-stage cryopanel 31 is used, the pumping speed can be varied arbitrarily by merely setting the temperatures at the second cold station and second-stage cryopanel 31 by the device.

In the embodiment of FIG. 11, the same effects as in the embodiment of FIG. 7 can be obtained, as well as the following effects.

With the embodiment of FIG. 11, since an electric heater and a power source are not required, the cost of operating the cryopump can further be reduced, and the construction thereof can be simplified.

The embodiment of FIG. 12 differs from the embodiment of FIG. 11 in that a heating pipe-mounting member 84 is provided on the portion of the second-stage cryopanel 31 which is around the second cold station with a heating pipe 81 wound spirally around this mounting member 84.

In the embodiment of FIG. 12, the same effects as in the embodiment of FIG. 11 can be obtained, as well as the same effects as in the embodiment of FIGS. 9 and 10.

The pressure sensor, which is provided in the vacuum chamber 60 in the embodiments of FIGS. 1, 2 and 3, may be provided in the vessel so that the pressure therein can be detected. In the embodiments of FIGS. 1 and 4, an inverter 71 is used as a means for converting the revolution number of the driving motor for the compressor; a means using gears may also be used for the same purpose. In the embodiments of FIGS. 11 and 12, a working gas of room temperature and high pressure is supplied to the heating pipe. If this working gas is a gas (or a fluid) having a solidifying point of not more than 40K, it can be used without being solidified in the heating pipe.

The present invention described above can provide a method of operating a cryopump and a cryopump which is provided with a cryopanel cooled with cold heat generated by a cold heat generating means, to remove the ambient gas, and a means for regulating the temperature of the cryopanel, and which is capable of varying the pumping seed by operating the cryopump while regulating, in accordance with ambient conditions, the temperature of the cryopanel.

What is claimed is:

1. A cryopump comprising a vessel communicatable with a part into which a gas is pumped, a cold heat generating means for generating a cold heat by adiabatically expanding a working gas, a cryopanel mounted to a cold station of said cold heat generating means accommodated in said vessel and cooled with said cold heat to remove a gas in said part into which the gas is pumped as well as in said vessel, and a temperature regulating means for regulating a temperature of said cryopanel by controlling one of a cold heating generating amount for said cold heat generating means and a heat rate for said cryopanel.

2. A cryopump comprising a vessel communicatable with a part into which a gas is pumped, a cold heat generating means for generating a cold heat by adiabatically expanding a working gas, a cryopanel mounted to a cold station of said cold heat generating means accommodated in the vessel, and a temperature regulating means for regulating a temperature of said cryopanel in accordance with ambient conditions, wherein said temperature regulating means include pressure detecting means for detecting the ambient pressure and means for one of increasing and decreasing a cold heat generation amount of said cold heat generating means in accordance with a different between said ambient pressure detected by said ambient pressure detecting means and a preset pressure.

3. A cryopump comprising a cryopanel adapted to be cooled with cold heat generated by a cold heat generating means and remove the ambient gas, and means for regulating the temperature of said cryopanel, said means for regulating the temperature including means for detecting the ambient pressure, and means adapted to receive a signal from said pressure detecting means and control the flow rate of a working gas supplied to an expansion means which constitutes said cold heat generating means, wherein said means for controlling the flow rate of said working gas includes a bypass pipe connected to a pipe through which said working gas discharged from said compression means constituting said cold heat generating means, and supplied to said expansion means passes, and a pipe through which said working gas discharged from said expansion means and returned to said compression means passes; a flow rate variable valve provided in said bypass pipe; and a control unit adapted to receive a signal from said pressure detecting means and control the degree of opening of said flow rate variable valve in accordance with a different between a preset pressure and a pressure detected by said pressure detecting means.

4. A cryopump comprising a vessel communicatable with a part into which a gas is pumped, a cold heat generating means for generating a cold heat by adiabatically expanding a working gas, a cryopanel mounted to a cold station of said cold heat generating means accommodated in the vessel, and a temperature regulating means for regulating a temperature of said cryopanel in accordance with ambient conditions, wherein said temperature regulating means includes a temperature detecting means for detecting the temperature of said cryopanel, and means for at least one of increasing and decreasing a cold heat generating amount of said cold heat generating means by the temperature of the cryopanel.

5. A cryopump comprising a cryopanel adapted to be cooled with cold heat generated by a cold heat generating means and remove the ambient gas, and means a for regulating the temperature of said cryopanel, said means for regulating the temperature includes means for detecting the temperature of said cryopanel, and means for receiving a signal from said temperature detecting means and control the flow rate of said working gas supplied to said expansion means constituting said cold heat generating means, and wherein said working means for controlling the flow rate of said working gas includes a bypass pipe connected to a pipe through which said working gas discharged from said compression means constituting said cold heat generating means, and supplied to said expansion means passes, and a pipe through which said working gas discharged from said expansion means and returned to said compression means passes; a flow rate-variable valve provided in said bypass pipe; and a control unit adapted to receive a signal from said temperature detecting means and control a degree of opening of said flow rate-variable valve.

6. A cryopump comprising a vessel communicatable with a part into which a gas is pumped, a cold heat generating means for generating a cold heat by adiabatically expanding a working gas, a cryopanel mounted to a cold station of said cold heat generating means accommodated in the vessel, and a temperature regulating means for regulating a temperature of said cryopanel in accordance with ambient conditions, and wherein said temperature regulating means includes a pressure detecting means for detecting an ambient temperature, and means for one of increasing and decreasing a heat rate for said cryopanel in accordance with a difference between said ambient pressure detected by said pressure detecting means and a preset pressure.

7. A method of operating a cryopump, the method comprising the steps of: generating a cold heat by a cold heat generating means by adiabatically expanding a working gas, cooling a cryopanel mounted to a cold station of a cold heating generating means accommodated in a vessel communicatable with a part into which a gas is pumped, and removing a gas from the cooled cryopanel and the part in which the gas is pumped as well as in said vessel, detecting at least one of a pressure in the part into which the gas is pumped as well as in the vessel and a temperature of the cryopanel, and regulating a temperature of said cryopanel by controlling a cold heat generating amount for said cold heat generating means or a heating rate for said cryopanel in accordance with a value of the detection.

8. A method of operating a cryopump according to claim 7, wherein said step of regulating the temperature of said cryopanel includes regulating the amount of the cold heat generated by the adiabatic expansion of said working gas in accordance with one of a pressure in said part into which the gas is pumped as well as in said vessel and the temperature of the cryopanel.

9. A method of operating a cryopump according to claim 8, wherein the step of regulating the amount of said cold heat includes regulating the flow rate of said adiabatically expanded working gas in accordance with one of the ambient pressure and temperature of said cryopanel.

10. A method of operating a cryopump according to claim 7, wherein said step of regulating the temperature of said cryopanel includes regulating a rate of heating of said cryopanel in accordance with one of the ambient pressure and the temperature of the cryopanel.

11. A cryopump comprising a vessel communicatable with a part into which a gas is pumped, a cold heat generating means for generating a cold heat by adiabatically expanding a working gas, a cryopanel mounted to a cold station of said cold heat generating means accommodated in the vessel, a temperature regulating means for regulating a temperature of said cryopanel in accordance with ambient conditions, wherein said temperature regulating means includes a temperature detecting means for detecting the temperature of said cryopanel, and means for at least one of increasing and decreasing a heat rate for said cryopanel by said temperature of said cryopanel detected by said temperature detecting means.

12. A cryopump comprising a cryopanel adapted to be cooled with cold heat generated by a cold heat generating means and to remove an ambient gas; a heating pipe means for supplying heat in said cryopanel; a heating fluid supply pipe means branched from a piping means through which a working gas is discharged from a compression means forming said cold heat generating means and supplied to an expansion means constituting said cold heat generating means passes, and connected to an inlet of said heating pipe means; a valve means provided in said heating fluid supply pipe means; and a heating fluid pipe return means connected to the outlet of said heating pipe means and connected together to a piping means through which said working gas discharged from said expansion means and returned to said compression means passes.

13. A cryopump comprising: a two-stage regenerator type expander means for generating the cold heat by adiabatically expanding a working gas; a first-stage cryopanel assembled on a first cold station of a first-stage expander of said two-stage regenerator type expander means, which is cooled with cold heat generated by said first-stage expander and removes an ambient gas; a second-stage cryopanel assembled on a second cold station of a second-stage expander of said two-stage regenerator type expander means, which is cooled with cold heat generated by said second-stage expander to a temperature lower than the temperature of said first-stage cryopanel and removes said ambient gas; and a temperature regulating means for regulating a temperature of said second-stage cryopanel in accordance with the ambient conditions.

14. A cryopump communicatable with a part into which a gas is pumped, a cold heat generating means for generating a cold heat by adiabatically expanding a working gas, a cryopanel mounted to a cold station of said cold heat generating means accommodated in said vessel and cooled with said cold heat to remove a gas in the part into which the gas is pumped as well as in said vessel, and a temperature regulating means for regulating a temperature of said cryopanel by controlling at least one of a cold heat generating amount for the cold heat generating means an a heating rate of said cryopanel in accordance with at least one of a pressure in said part into which the gas is pumped and a temperature of said cryopanel.

15. A cryopump according to claim 14, wherein said temperature regulating means includes a pressure detecting means for detecting the pressure in said part into which the gas is pumped as well as in said vessel and means for one of increasing and decreasing a cold heat generating amount of said cold heat generating means in accordance with a difference between a value of pressure detected by said pressure detecting means and a preset pressure.

* * * * *